United States Patent [19]

James

[11] 4,035,003
[45] July 12, 1977

[54] PIPE JOINT FOR LARGE DIAMETER FLEXIBLE PIPES

[75] Inventor: Kenneth E. James, Denver, Colo.

[73] Assignee: Concrete Pipe Consultants, Inc., Englewood, Colo.

[21] Appl. No.: 537,274

[22] Filed: Dec. 30, 1974

[51] Int. Cl.² .......................................... F16L 9/14
[52] U.S. Cl. .................................. 285/55; 285/288
[58] Field of Search ............ 285/15, 294, 295, 297, 285/230, 284–288, 55; 138/97

[56] References Cited

U.S. PATENT DOCUMENTS

| 978,346 | 12/1910 | Yarrow | 285/294 |
| 2,173,792 | 9/1939 | Trommell | 285/288 |
| 2,576,012 | 11/1951 | Gurck | 285/288 |

FOREIGN PATENT DOCUMENTS

| 1,476,758 | 3/1967 | France | 285/295 |
| 747,332 | 3/1933 | France | 285/288 |
| 840,751 | 1/1939 | France | 285/295 |

Primary Examiner—Dave W. Arola

[57] ABSTRACT

A pipe joint for large diameter steel pipe in the range of 54 to 140 inches or greater, reinforced plastic-mortor pipe larger than 42 inches, ductile-iron pipe larger than 30 inches, and glass reinforced plastic pipe larger than 20 inches which includes a spigot having an annular groove formed between two spaced ribs for receiving an annular gasket which extends outwardly beyond the ribs. Under usual circumstances, when the spigot is positioned within the bell of the adjacent pipe, the gasket engages the interior surface of the bell as well as the surfaces of the annular groove in the spigot. However, during assembly in those instances where the bell and/or the spigot are out of round, the spigot can be forced toward the bell so that the gasket engages the inner surface thereof around its entire periphery and can be held temporarily thereagainst by means of jacks and braces. In either event, once properly positioned the joint is completed by placing grout between an extending lip of the spigot and the inner surface of the bell. When the grout hardens it will maintain the gasket in position against the surface of the bell even after the braces and jacks are removed and will enhance the ability of the joint to resist transverse shear. If subsequent leakage occurs, repair can be made by replacing a portion or all of the grout with a sealant.

3 Claims, 6 Drawing Figures

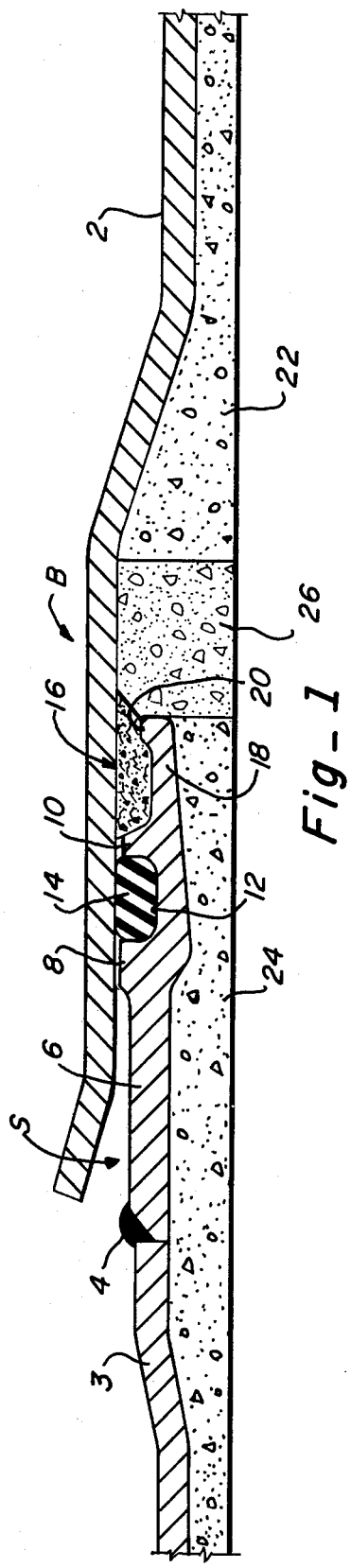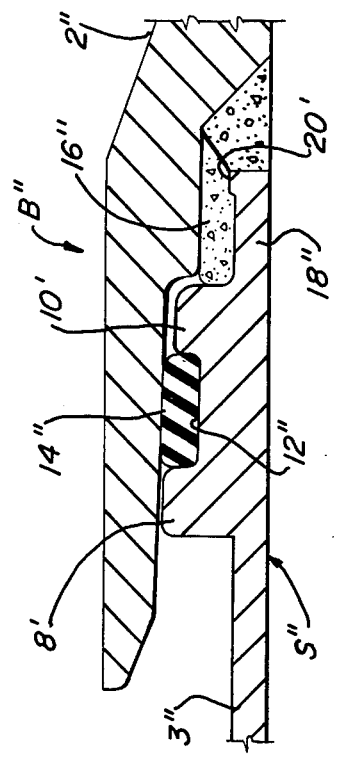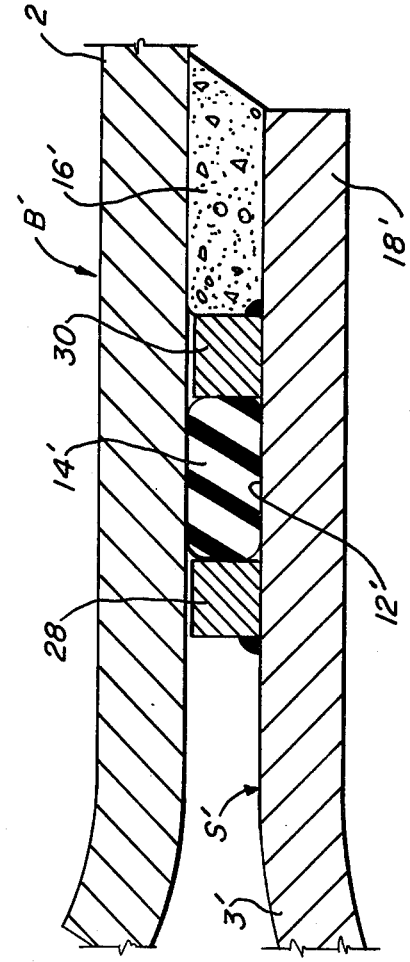

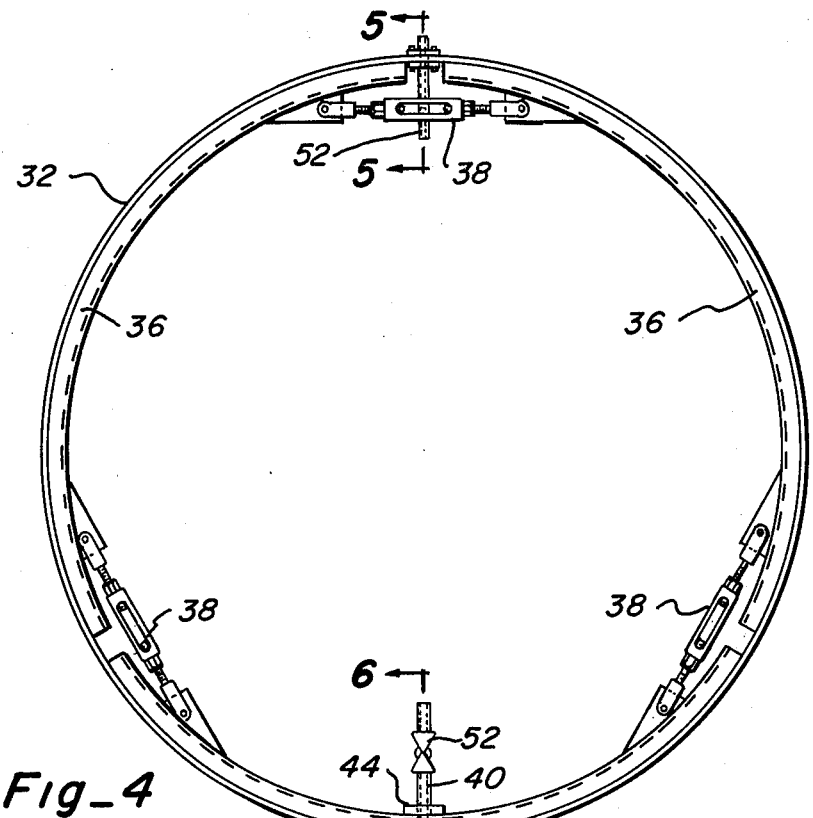
Fig_4
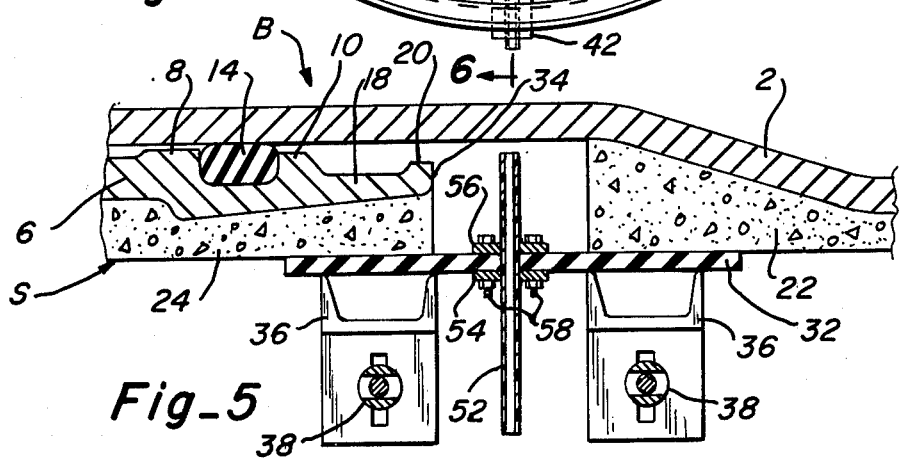
Fig_5
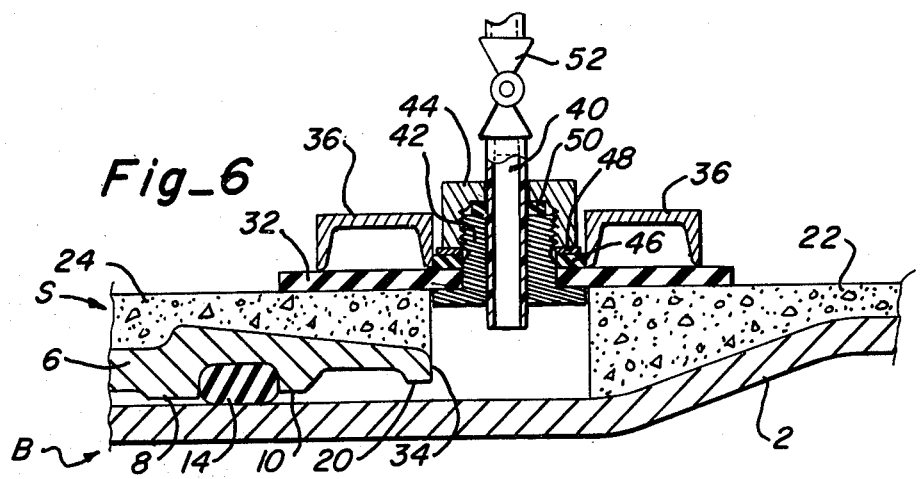
Fig_6

PIPE JOINT FOR LARGE DIAMETER FLEXIBLE PIPES

BACKGROUND OF THE INVENTION

1. Field of the Invention

The invention relates to a rubber gasket type joint for pressure pipe and more particularly one for use with large diameter flexible pipe.

2. Description of the Prior Art

The pipe coupling art is well developed. For example, in the rigid pipe art, i.e., concrete pipe, bell and spigot interconnections wherein a rubber gasket is utilized as the sealing means are shown in U.S. Pat. No. 2,223,434 to Trickey; U.S. Pat. No. 2,576,012 to Gurck; and U.S. Pat. No. 3,129,961 to Danko, et al. and are exemplary of the art. However, it is important to note that sustained watertightness of each joint configuration above disclosed is highly dependent upon the rigidity of the barrel of the pipe to resist deflection so as to maintain required gasket compression and prevent formation of excessive clearance (between the exterior periphery of the heel shoulder forming the gasket recess and the interior surface of the bell) through which the gasket might be extruded by internal pressure and thus become displaced. While such joints have been utilized successfully for semi-rigid pipe of moderate diameter and for semi-flexible pipe of lesser diameter, they have proved to be unsatisfactory for large diameter flexible pipe wherein required joint tolerances are most difficult to maintain; bell and/or spigot ends are frequently out of round, or ever worse, contain flattened portions and finally; (following subgrade preparation, laying of the pipe, joint assembly, embedment and backfill), the spigot or the bell end of the joint may be subjected to the effects of (1) uneven vertical overfill load, (2) differential subgrade settlement, and (3) transverse shear through the joint resulting from (1) and/or (2) above which is most likely to cause radial movement with respect to one another.

An ideal rubber gasketed joint would include metal to metal contact between spigot shoulder and bell surface around 360° of circumference. In this instance an external force acting inwardly on the spigot end of one pipe, such as a rock protruding from the subgrade, would be immediately resisted and radial clearance which might otherwise be caused between spigot shoulder and bell surface would be minimal. In order to deflect inwardly, a portion of the circumference of the truly circular spigot must become flattened. But since the circumference of the spigot would then necessarily be shorter, the force causing such flattening must be sufficient to compress the spigot metal circumferentially: a very large force, indeed! While the above described ideal joint embodies several desirable features, assurance of metal to metal fit for interchangeable parts would prohibit use of required manufacturing tolerances. Additionally, lacking clearance between the parts, field assembly would be impractical if not impossible. However, if and when clearance between the parts is provided to accommodate manufacture and to facilitate assembly the above described force required to cause flattening is greatly reduced. The only circumferential resistance offered would be sliding friction between the parts. This invention permits use of generous manufacturing tolerances and initial clearances, and yet after grouting provides the beneficial effects resulting from metal to metal contact between the parts.

Thus, for large pipes flexible pipes complex and expensive couplings are required to accommodate this relative movement between pipe sections. A successful example of this is the Dresser coupling which has many parts mounted externally of the pipe interconnected by a plurality of bolts based around the coupling for drawing it tight. While rubber gasket joints have been used, whenever the pipe is out of round such that the bell and spigot do not match up to assure that the gasket will touch at all locations, there will be leakage and in some instances if the pressures are sufficient the gasket will be extruded through the space between the bell and spigot causing further leakage problems. There are many conditions which can cause pipe ends to be out of round during and subsequent to the time the joint is assembled. For example, the out of round condition might occur (a) during manufacture, handling, loading, transporting, unloading, placing and assembly in a trench, (b) due to a non-uniform bed under adjacent pipe sections, and (c) due to non-uniform covering over the pipe which creates a non-uniform load over adjacent pipe sections, and may be expected whenever pipe passes through a retaining wall or starts into the side of a hill. Also, after assembly, distortions can occur due to uneven settling of the bedding or other conditions which create shifting of the pipe sections or uneven loading on them. If the joint is not held securely under such conditions, deflections at the joint may occur which result in leakage.

Welded joints for flexible pipe are also well known and are satisfactory in some environments but they can rupture due to expansion of the pipe or due to movement of the earth or due to earthquakes and the like. For this reason, welded joints cannot be used in areas where earth movement is likely. Furthermore, welding is quite expensive and therefore often economically unfeasible.

SUMMARY OF THE INVENTION

The present invention relates to a rubber gasketed pipe joint for large diameter pipes in which the foregoing problems are minimized. The spigot is dimensioned with respect to the bell so that it is easily received in the bell and the tolerances are not extremely critical. This permits easy insertion of the spigot within the bell and alignment of the bell and spigot in proper position. The spigot is provided with an annular groove between adjacent ribs for receiving a gasket which extends outwardly beyond the ribs for engagement of the inner surface of the bell. Should the spigot or bell be out of round so that the gasket does not in fact engage the bell entirely around its periphery, as for any of the reasons described above, suitable jacks, braces, etc. can be used to force the bell and spigot toward each other at those points until the gasket is in contact around the entire periphery. Following assembly and special alignment when required, grout is placed in a recess formed between an extending lip of the spigot and the inner surface of the bell which after hardening holds and maintains the spigot and bell in their proper position. When utilized, any braces and jacks can be removed after the grout has hardened and the joint will stay in its prelocated position. Should any longitudinal movement of the spigot and bell subsequently take place, the grout will move with the joint due to a protrusion in the lip of the spigot which interlocks the grout to the spigot so that they move together. Furthermore, in the event of any subsequent uneven loading on adjacent pipe sections or of differential subgrade settlement, distortion of the joint will be minimized due to the grout between the bell and spigot.

Furthermore, in the unlikely event that leakage does occur, a portion or al of the grout can be removed and replaced with sealant introduced into the recess formed between the extending lip of the spigot and the inner surface of the bell and thus provide a second watertight sealing means. This is accomplished by placing an annular form inside of the lining of the pipe and adjacent the recess and then pumping the sealant through a first opening in the bottom of the form and venting air through a second opening in the top of the form until sealant begins to come out the top opening. Both openings are then closed and the sealant allowed to harden after which the form can be removed. Thus, the recess is suitable for receiving one or both of two types of self-hardening filler for holding alignment within the joint, i.e., (a) a grout which hardens to form an original joint or (b) a sealant which hardens to form a repaired joint.

In one embodiment the ribs which form the annular groove are formed integrally with a steel spigot which is welded to the end of a steel pipe. In another embodiment the ridges are separate members formed as rings welded to the periphery of the spigot in parallel relationship to form the recess. In still another embodiment, a flexible plastic pipe is formed with integral ribs which form an annular groove therebetween.

Additional advantages of the invention will become apparent from the description which follows, taken in conjunction with the accompanying drawings.

BRIEF DESCRIPTION OF THE DRAWINGS

FIG. 1 is a longitudinal fragmentary section of one form of pipe joint of this invention for use with flexible steel pipe;

FIG. 2 is a longitudinal fragmentary section of an alternative form of pipe joint for use with flexible steel pipe;

FIG. 3 is a fragmentary longitudinal section of still a further embodiment of the pipe joint of this invention for use with flexible plastic pipe;

FIG. 4 is a plan view of a form for use in injecting sealant into a pipe joint to repair leakage of a joint;

FIG. 5 is a vertical section, on an enlarged scale, taken along line 5—5 of FIG. 4 showing an air-bleed arrangement used in connection therewith; and FIG. 6 is a vertical section, on an enlarged scale, taken along line 6—6 of FIG. 4 showing a sealant inlet for the form.

DESCRIPTION OF THE PREFERRED EMBODIMENTS

In accordance with this invention, a pipe joint is provided which includes a bell B conveniently formed at one end of a large diameter pipe 2, such as a steel pipe. The joint connection is completed by a spigot S which is attached to the end of a pipe section 3 as by weld 4. From the cross section of the spigot it can be seen that this structure cannot be made integrally with the barrel of the pipe but must be separately rolled and formed for attachment to the end of pipe section 3 in the plant. Spigot S includes a leg 6 extending from weld 4 and having spaced ribs 8 and 10 formed integrally with leg 6 and which between them form an annular groove 12 for receiving a resilient gasket, such as round rubber gasket 14. Conveniently, gasket 14 is sized to extend outwardly beyond the peripheral edge of both ribs 8 and 10 and rib 8 extends outwardly beyond rib 10. A suitable gasket has been found to be one which is 55± 5 shore-A durometer. It has been found that if the ribs 8 and 10 are sized so that the spacing of rib 10 from bell B is about 1/16 of an inch and rib 8 is spaced from bell B from a distance of about 1/32 of an inch the spigot can be relatively easily inserted within the bell and the two lengths of pipe adjusted relatively to each other with a minimum of difficulty. In other words, rib 10 is about 1/32 of an inch lower than rib 8. If either the bell or the spigot is out of round so that gasket 14 does not touch the bell, then appropriate jacks and braces can be placed within spigot S to force the spigot and gasket 14 against the bell.

It will be understood that any unequal loading placed on the pipe sections as described above can produce an out of round condition on either the bell or spigot that can create a much larger space than the 1/32 inch space between rib 8 and the inner surface of bell B, such as on the order of ¼ inch or more. If this condition is not corrected, gasket 14 can be extruded between rib 8 and the inner surface of bell B due to high fluid pressures in the pipe line during use. If this occurs the leakage will be more severe.

When proper alignment has been made so that the gasket 14 touches bell B around its entire periphery the structure can be fixed in this position by inserting grout 16 in the annular recess formed between outwardly extending lip 18 of the spigot and the inner surface of bell B. This grout is placed in the recess by hand. It has been found that 1:3 dry packed fiber filled pre-shrunk cement mortar works satisfactorily. Conveniently, lip 18 includes a protrusion 20 on the end thereof, as shown, which forms an annular ridge that locks the grout to the spigot so that should there by any subsequent longitudinal shifting of the spigot with respect to the bell, the grout will move with the spigot and therefore maintain gasket 14 against the surface of bell B to prevent leakage. Obviously, once grout 16 has been put in place and has been allowed to harden, the spigot cannot shift laterally, i.e. radially anywhere around its periphery with respect to bell B and therefore the braces and jacks which may have been used to position it can be removed assuring radial fixity without any danger of subsequent lateral shifting. If desired, a cement mortar lining 22 and 24 may be centrifugally spun in the plant or subsequently placed in the field in respective pipe sections 2 and 3, as shown in FIG. 1. Since lining 22 does not extend into bell B, a gap is left between linings 22 and 24 after assembly of the joint. This gap is used for access to place grout 16 and then can be sealed with mortar 26.

An alternative embodiment is shown in FIG. 2 wherein one pipe section 2' having a bell B' connects to spigot S' formed integrally with pipe section 3'. In this embodiment, annular groove 12' is formed for gasket 14' by means of annular ribs 28 and 30, respectively which are formed by spaced parallel rings attached to spigot S' as by welding. As in the previous embodiment, rib 30 is slightly shorter than rib 28 for ease of assembly and gasket 14' extends outwardly beyond the peripheral edge of either of the ribs to engage the inner surface of bell B'. The joint is assembled as described above and after proper positioning has been achieved grout 16' can be put in place between the outwardly extending end of spigot S' and the inner surface of bell B'. This pipe may be lined with spun coal tar enamel, not shown, if desired.

A still further embodiment is shown in FIG. 3 in which a pipe section 2" has a bell B" attached to a spigot S" formed integrally with a plastic pipe section 3" for forming a joint with a bell B". In this embodiment, spigot S" includes spaced annular ribs 8' and 10' as shown which are similar ribs 8 and 10 of FIG. 1 and are spaced from the inner edge of the bell in a similar manner. A gasket 14" is provided in an annular groove 12" formed between the annular ribs 8' and 10'. As in the other embodiments, gasket 14" is dimensioned so that its peripheral edge extends outwardly beyond the peripheral edges of both ribs 8' and 10' to form a watertight seal. Once the spigot S" has been properly positioned within bell B", as previously described, grout 16" can be placed in the recess formed between lip 18" and the inner surface of bell B" as shown. Lip 18 includes a protrusion 20' to assure that should any longitudinal slipping occur between spigot S" and bell B" the grout will move with the spigot to maintain the proper spacing between the spigot and bell so that gasket 14" continues to form a perfect seal entirely around the periphery of the connection.

Advantageously, should any of the above-described joints subsequently leak, they can be repaired in a very efficient and economical manner by removing all or a portion of grout 16 and replacing it with a self-hardening sealant, such as polysulfide, polyvinyl chloride or polyurethane. First, mortar 26 of FIG. 1 is removed from the gap formed between concrete linings 22 and 24 and all or a portion of grout 16 is also removed. A flexible rubber belt 32 is positioned within the joint as shown in FIGS. 4-6 so that it spands gap 34 and is held in engagement with liners 22 and 24, respectively by three pairs of curved channel members 36. These channels are held in position against belt 32 by means of turn buckles 38 which interconnect the respective channels as shown. As will be readily understood, once the channels 36 are positioned by turn buckles 38 against belt 32 a completely sealed annular space is formed in the joint which can be filled with a sealant as described below.

The belt is provided with an inlet as best seen in FIG. 6 and an outlet as shown in FIG. 5. The inlet comprises a tube 40, conveniently made of plastic, which extends through the web and is held in place by a plug 42 having external threads for receiving a cap 44 as shown. To prevent leakage around this connection a first washer 46 made of hard material, such as steel rests upon the web 32 and between it and the lower surface of cap 44 a softer washer, 48, made of a more resilient material, such as rubber, is provided. Also, a third washer 50 may be provided around pipe 40 and at the upper end of plug 42 to complete the seal. Pipe 40 may be fitted with a valve 52 to control the flow of the sealant under pressure into the annular space provided. As the sealant is pumped through inlet pipe 40 air is permitted to escape through an outlet tube or pipe 52 which also extends through web 32, as shown in FIG. 5, and is held in place by metal plates 54 and 56 which are interconnected by bolts 58 running therethrough as shown. Conveniently, prior to inserting the sealant material inlet tube 52 is pushed outwardly so that it contacts the inner surface of the bell and the upper end can be provided with a V-shaped notch, not shown, to allow air to enter the tube and be discharged. To form a seal, the sealant material is pumped by means (not shown) through valve 52 and inlet pipe 40 into the annular opening previously described and this pumping operation continues until all air in this opening has been discharged through outlet tube 52. When the annular recess is completely filled the sealant material will also be discharged from tube 52 whereupon it can be clamped shut and valve 52 can be closed.

After the sealant has been hardened the respective inlet and outlet tubes can be cut off and the belt 32 removed by loosening turn buckles 38 to remove channels 36. Thus, in addition to the original seal 14 which has become defective, the sealant provides an additional second seal between the space formed by extending lip 18 on spigot S and the inner surface of bell B and also serves the function of preventing relative lateral movement between the spigot and bell.

From the foregoing, the advantages of this invention are readily apparent. A joint structure has been provided for use with large diameter flexible pipes wherein the pipes can be easily connected due to a relatively loose fit between the spigot and bell and yet can be positioned so that an annular gasket between the two makes a complete seal around the periphery of the joint and then is held in fixed position by means of grout interposed between the lip of the spigot and the inner surface of the bell. In the embodiment of FIG. 1 such a structure is provided for a flexible steel pipe wherein annular ribs are formed integrally with the spigot to form an annular groove for receiving the gasket. The grout is held in place by the lip and a protrusion thereon which assures that should there be any longitudinal movement between the spigot and the bell that the grout will move with the spigot to maintain proper spacing between the spigot and bell so that the gasket makes a complete seal at all times. In the embodiment of FIG. 2 the same objective is accomplished but the ribs are separately formed from the spigot as rings and are attached thereto, as by welding. The embodiment of FIG. 3 is similar to that of FIG. 1 but the spigot is formed integrally with the plastic pipe.

Furthermore, a method is provided whereby should a pipe joint of this construction leak it can be repaired by removing all or a portion of grout and refilling the space with a plastic sealant which serves as a second gasket and also prevents relative movement between the spigot and bell.

The invention has been described in detail with particular reference to preferred embodiments thereof, but it will be understood that variations and modifications can be effected within the spirit and scope of the invention.

What is claimed is:

1. A pipe joint for large diameter flexible pipe including:
   a bell formed at one end of a first pipe section;
   a spigot formed at one end of a second pipe section for attachment to the bell of the first pipe section to form said joint wherein the spigot includes:
   first and second spaced annular ribs around said spigot forming an annular groove therebetween and spaced from the end thereof a distance at least equal to the width of the groove;
   a gasket in said groove which completely fills said groove and engages both annular ribs having a peripheral edge extending beyond the peripheral edges of said ribs and engageable with the inner surface of said bell to form a liquid-tight seal;

a lip on said spigot extending between said end and said second rib a distance at least equal to the width of said gasket and spaced from said inner surface of said bell forming a recess which is wider than said groove for receiving a self-hardening filler;

a self-hardening filler in said recess which, when hardened, will hold said spigot and bell in radially fixed relationship so that said gasket forms a seal around the entire periphery of said joint with the inner surface of said bell, said filler substantially completely filling said recess and in contact with the inner surface of said bell; and an outwardly extending protrusion on said lip forming an annular ridge for holding said filler in position relative to said spigot to assure radial fixity so that upon any longitudinal movement of said spigot with respect to said bell or any flexing of the joint said gasket will be maintained in sealing relationship with the inner surface of said bell.

2. A pipe joint, as claimed in claim 1, wherein: said ribs are formd integrally with said spigot.

3. A pipe joint for large diameter flexible pipe including:

a spigot formed at one end of the first pipe section and having a cement lining extending to the end thereof;

a bell formed at one end of a second pipe section for attachment to the spigot of the first pipe section to form the joint and having a cement lining spaced from the end thereof a substantially greater distance than that required for the spigot to fit into said bell to form a substantial gap between the cement linings on the spigot and bell; wherein the spigot includes:

first and second spaced annular ribs around said spigot forming an annular groove therebetween and spaced from the end thereof a distance at least equal to the width of the groove, the peripheral edge of said rib closest to the end of said spigot being slightly lower than the peripheral edge of said other rib to facilitate assembly of said spigot and said bell;

a gasket in said groove which completely fills said groove and engages both annular ribs having a peripheral edge extending beyond edges peripheral edged of said ribs and engageable with the inner surface of said bell to form a liquid-tight seal;

a lip on said spigot extending between said end and said second rib a distance at least equal to the width of said gasket and spaced from said inner surface of said bell forming a recess which communicates with the gap between the cement liners for receiving a self-hardening filler, and which recess is wider than said groove;

a self-hardening filler in said recess which when hardened will hold said spigot and bell in radially fixed relationship so that said gasket forms a seal around the entire periphery of said joint with the inner surface of said bell, said filler substantially completely filling said recess and in contact with the inner surface of said bell;

an outwardly extending protrusion on said lip forming an annular ridge for holding the filler in position relative to said spigot to assure radial fixity so that upon any longitudinal movement of said spigot with respect to said bell or any flexing of the joint, said gasket will be maintained in sealing relationship with the inner surface of said bell; and mortar in the gap between the respective ends of the cement liners.

* * * * *